UNITED STATES PATENT OFFICE.

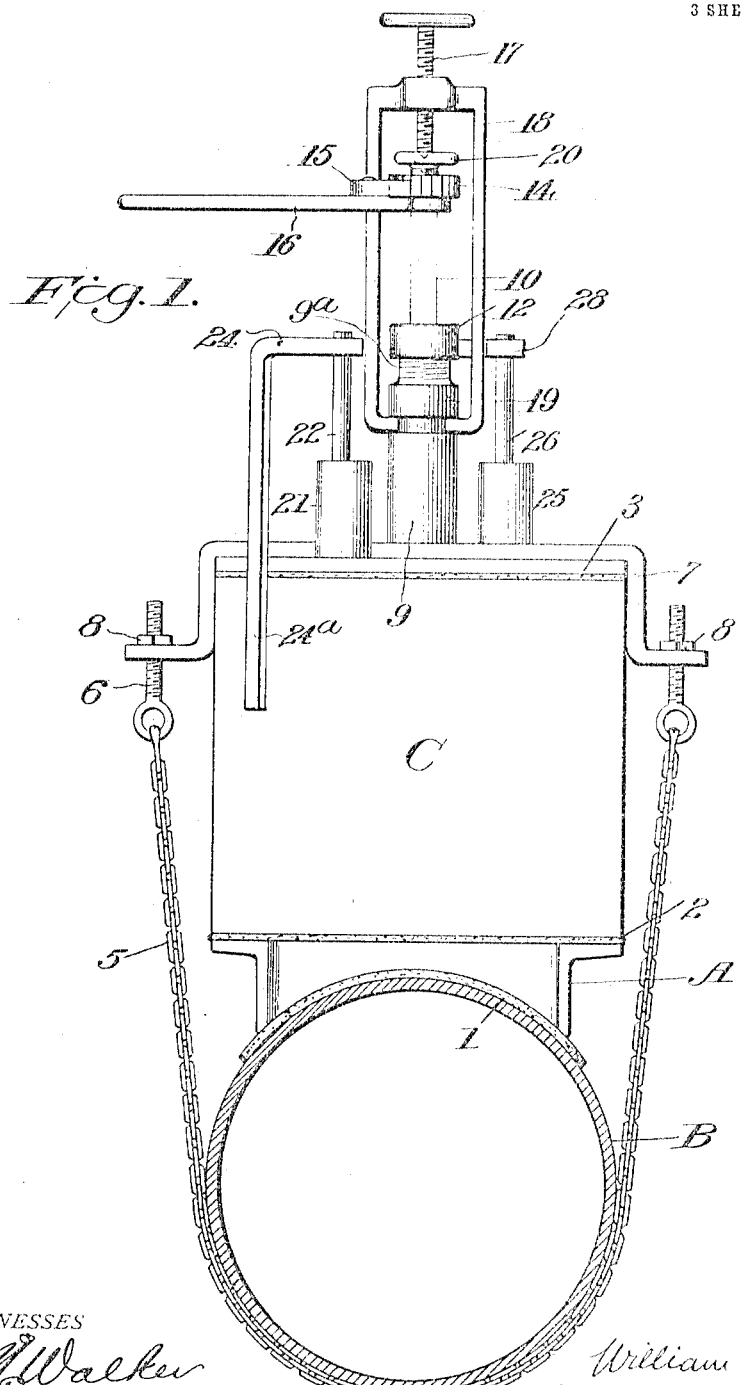

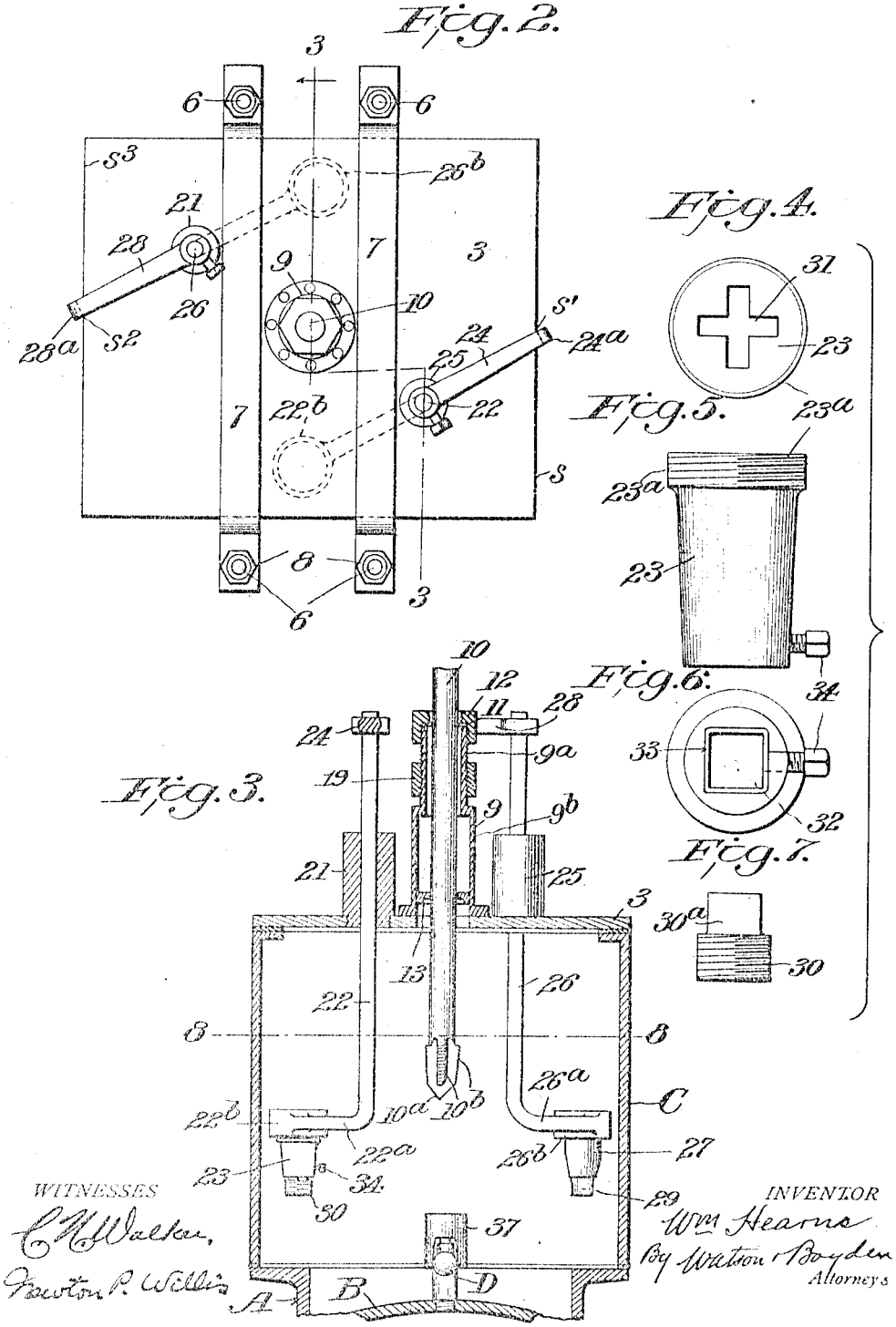

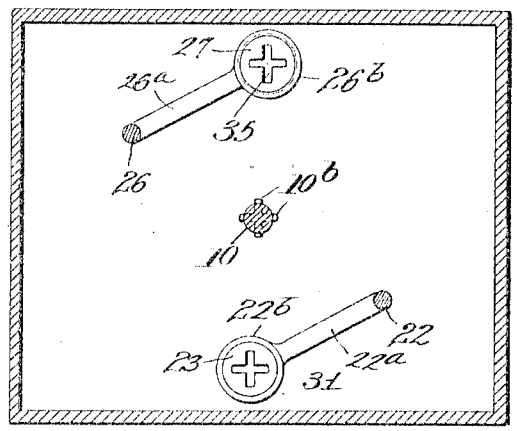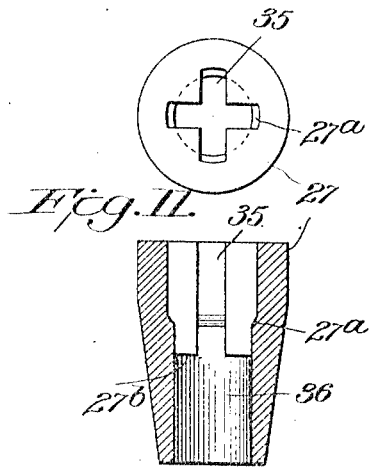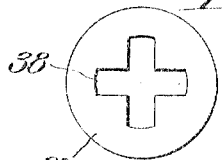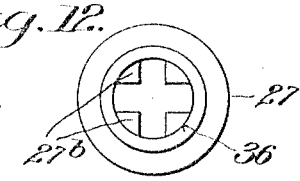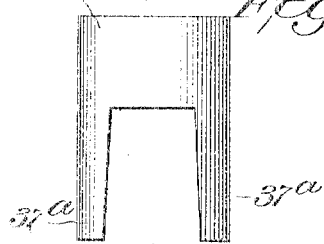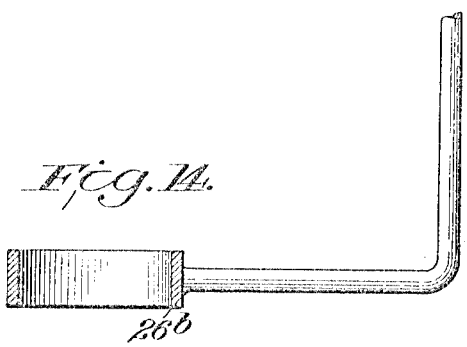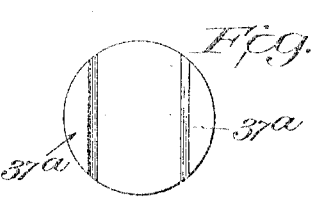

WILLIAM HEARNS, OF WASHINGTON, DISTRICT OF COLUMBIA.

DEVICE FOR REMOVING AND INSERTING TAPS AND PLUGS IN WATER-MAINS.

1,040,538.  Specification of Letters Patent.  Patented Oct. 8, 1912.

Application filed June 24, 1911. Serial No. 635,220.

*To all whom it may concern:*

Be it known that I, WILLIAM HEARNS, a citizen of the United States, residing at Washington, District of Columbia, have invented certain new and useful Improvements in Devices for Removing and Inserting Taps and Plugs in Water-Mains, of which the following is a specification.

This invention relates to improvements in devices for removing tap-pipes or plugs from water mains and for inserting tap-pipes or plugs in water mains without the necessity of stopping the flow of water through the pipes.

The details and operation of my invention will be clear from the following description, taken in connection with the accompanying drawing, in which,—

Figure 1 is a side elevation of a machine embodying my invention; Fig. 2 is a top plan view of the same; Fig. 3 is a section on the line 3—3 of Fig. 2, looking in the direction of the arrow; Figs. 4, 5 and 6 are top, side and bottom views, respectively, of the socket for holding threaded metal plugs; Fig. 7 is a side view of a threaded metal plug; Fig. 8 is a horizontal section through the casing on the line 8—8 of Fig. 3; Figs. 9, 9$^a$ and 9$^b$ are top, side and bottom plan views, respectively, of the socket or fitting for removing the tap-pipes; Figs. 10, 11 and 12 are top, side and bottom plan views, respectively, of the fitting for holding the emergency plugs; Fig. 13 is a detail view showing, in vertical section, the holder for threaded plugs; Fig. 14 is a similar view showing the holder for emergency plugs.

Referring to the drawing, A indicates a saddle comprising a metal frame having four sides, and open at the top and bottom, the lower edges being curved to conform substantially to the curvature of the pipe B to which the saddle is applied. When in position upon the pipe a gasket 1 is arranged between the lower edges of the saddle and the pipe to prevent leakage, a gasket 2 is placed upon the upper edges of the saddle, and the casing C, to which my improvements are applied, rests upon the gasket 2. The casing C is rectangular in form, and is provided with a top plate 3, its lower end being open so that when the casing and saddle are in position they form, with the pipe, a closed chamber around that portion of the pipe where the pipe-tap or plug is to be removed or inserted. The saddle is made separate from the casing in order that different saddles may be used with the casing for pipes of different sizes, the curvature of the lower edges of the saddles varying with the diameters of the pipe. When the apparatus is applied to a pipe the parts are held in position by chains 5 which pass beneath the pipe and are provided at their ends with threaded bolts 6 which extend through bars 7 laid upon the top of the casing, nuts 8 upon the bolts being provided for tightening the chains.

In the center of the top 3 of the casing is arranged a tubular guide 9 for a tool 10, which tool, in the present invention, serves the several purposes of a drill, a tapping or threading device and wrench, or as a rod for driving an emergency plug into an opening in the pipe. The tool is pointed, as shown at 10$^a$, for drilling purposes, and is provided with laterally projecting threaded wings 10$^b$ for tapping threads in the opening in the pipe. As shown in the drawing there are four of these wings and these are adapted to engage recesses in fittings, hereinafter more particularly referred to, the tool forming a socket wrench for turning these fittings. The guide 9 has its upper portion threaded as shown at 9$^a$ and upon the upper end of the guide is arranged a washer 11 which closely encircles the shank of the tool and is held in place by a cap 12. The lower portion 9$^b$ of the guide is larger in diameter than the upper portion, as shown, and within said enlarged portion is fitted a bushing 13 which also guides the shank of the tool. The washer or bushing 11 and the bushing 13 are removable and may be replaced by bushings having larger or smaller openings to suit tools having shanks of different diameters. The tool may be turned and also moved longitudinally within the guide 9 and in order to turn the tool and feed it to the work a ratchet wheel 14, pawl 15, and lever 16 are removably connected to the upper end of the tool shank and a feed screw 17, held in a yoke 18, is adapted to bear upon the end of the tool shank. The two arms of this yoke fit under a nut 19 threaded upon the part 9ª of the guide 9. By loosening the feed screw the yoke may be readily detached, when desired, and the ratchet wheel and lever may be lifted off of the tool shank. A small hand wheel 20 is also removably connected to the shank so that if it is desired to use the tool without the feed screw at any time pressure may be applied to the tool by the hand, bearing against the wheel 20.

A bearing or stuffing box 21 is provided in the top of the casing and a round rod 22 extends through this bearing, the lower end 22ª of the rod being turned at a right angle to the main portion or shank and having at its extremity an internally threaded ring or holder 22ᵇ adapted to receive the threaded end 23ª of a fitting 23 (Figs. 4, 5 and 6) which fitting is adapted to receive a threaded plug 30, as hereinafter explained. A lever 24, is secured to the upper end of the rod 22, and this lever has a downwardly extending arm 24ª adapted, in two positions of the lever, to engage one side of the casing, which forms a stop for the lever. When the lever is swung so that the arm engages the casing at the point s, the holder 22ᵇ is centered under the tool 10 and when the lever is swung into engagement with the casing at the point s' the holder occupies the position shown in dotted lines in Fig. 2. A stuffing box 25 is also provided upon the top of the casing and a rod 26 extends through this bearing or stuffing box. This rod has an arm 26ª at its lower end, turned at right angles to the main portion of the rod, and is provided at its extremity with a holder 26ᵇ in the form of a ring which is similar to the holder 22ᵇ except that its interior surface is not threaded. This ring is adapted to receive a fitting 27 (Figs. 10, 11 and 12), for holding an emergency plug 29, as hereinafter referred to. A lever 28 is secured to the upper end of the rod 26 and an arm 28ª projecting downwardly from the lever is adapted to engage a side of the casing, which limits the swinging movement of the lever. When the arm 28ª is in engagement with the side of the casing at the point s², as shown in Fig. 2, the holder 26ᵇ is out of line with the tool 10, but when the lever 28 is swung so that its arm engages the casing at the point s³ the holder 26ᵇ is centered beneath the tool 10.

The fitting 23 has a cross-shaped socket 31, in its upper end, adapted to receive the lower end of the tool, and the lower end of said fitting has an angular socket 32 adapted to receive the angular end 30ª of a threaded plug 30. As the plugs to be inserted in the pipes are of various sizes, the socket 32 may be provided with a bushing 33 according to the size of the end of the plug. A set screw 34 is provided for securing the plug to the fitting. In preparing to use the device a fitting 23 is screwed into the holder 22ᵇ and a plug 30 is secured within the lower socket in the fitting. It will be seen that if this holder is swung into the central position under the tool and over a threaded opening in the pipe, and the tool is then lowered so that its wings 10ᵇ enter the socket 31, a rotation of the tool in the right direction will screw the plug into the pipe and screw the fitting out of the holder 22ᵇ, so that the latter may be lifted away from the fitting and upon the removal of the apparatus from the pipe the plug and fitting will remain. The fitting may then be detached from the plug, leaving the latter in its intended position in the pipe.

The fitting 27 (Figs. 10, 11 and 12) is intended to receive wooden plugs 29, one of which is shown in Fig. 3. One of these plugs may be used as a temporary closure for the opening in the pipe where it is found impossible to insert a threaded plug at the time. This fitting has a cross-shaped opening 35 in its upper portion, forming a socket to receive the tool 10 and inclined shoulders 27ª for the wings of the tool to rest upon, and it has a circular socket 36 in its lower portion adapted to receive a wooden plug 29 the upper end of which fits against shoulders 27ᵇ. The wooden plug is held frictionally within the socket 36, and the fitting 27 has a smooth exterior and is held frictionally within the holder 26ᵇ, a splint of wood or a strip of paper being used, if necessary, as a temporary wedge to hold the fitting in place. If the occasion demands, the holder 26ᵇ is swung into line with the tool and with the opening in the pipe, and the tool is then lowered into the socket 35 and tapped with a hammer until the plug is driven securely into the opening in the pipe and the fitting 27 is driven from the holder 26ᵇ. When the apparatus is removed from the pipe the fitting and plug remain and the fitting may then be taken off. The fitting, as shown, is hollow, the sockets communicating with one another. The point of the tool, therefore, does not strike the fitting, the wings only engaging the shoulders 27ª.

A fitting 37 (Figs. 9, 9ª and 9ᵇ) is also provided for the purpose of engaging pipe taps which are to be removed from the main pipes. This fitting comprises forked arms 37ª, suitably formed to engage the valve portion of a pipe-tap and in the upper end of the fitting is provided a cross-shaped socket 38 adapted to receive the end of the tool 10.

In operation, if a pipe-tap D is to be removed from a pipe and a plug substituted, the fitting 37 is first placed upon the pipe-tap and fittings 23 and 27 are arranged in their respective holders 22ᵇ and 26ᵇ, a threaded plug 30 being held within the fitting 23 and a wooden plug 29 being held within the fitting 27. The saddle and casing are then secured to the pipe and the holders for the fittings are swung away from the center of the box, as indicated in dotted lines in Fig. 2. The tool 10 is then lowered until its wings engage the socket 38 in the fitting 37 and the feed wheel and ratchet are connected to the tool, or the latter may be operated by the ratchet and lever without applying the feed wheel. By turning the tool in the right direction the pipe-tap is unscrewed from the pipe and the water pressure forces the pipe-tap and tool upward, or the latter may be moved upward until the fitting 37 strikes the top of the casing, when it will be stripped from the tool and will fall at one side of the opening in the pipe. The tool 10 may then be lowered and turned so as to re-thread the opening in the pipe, after which, unless the pipe is so corroded that it cannot be re-threaded without being rebored, the lever 24 is turned so as to swing fitting 23 over the opening and the rod 22 is then lowered to position the plug 30 over the opening. The tool 10 is then moved downward into the socket 31 in the fitting 23 and by turning the tool the plug is threaded into the opening in the pipe and the fitting 23 is simultaneously unscrewed from the holder 22ᵇ. After the plug is inserted the casing is removed and the set screw 34 loosened and the fitting 23 thus removed from the plug. If, however, it is found that after the removal of the pipe-tap, the opening is so badly corroded that it cannot be re-threaded by the tool then in use so as to receive the threaded plug, the emergency plug 29 is swung into line with the tool and the latter is lowered into the socket 35, in the fitting 27, and by tapping upon the end of the tool the plug is driven into the opening in the pipe and the fitting is driven out of the holder 26ᵇ. The casing may then be removed, the flow of water being stopped. A tool suited for boring and threading a larger opening in the pipe may then be inserted in the apparatus and a threaded plug suited for this larger opening may be inserted in the fitting 23, after which the casing may be replaced and by operating the tool the wooden plug may be cut out of the opening, the latter enlarged and threaded, and the threaded plug may then be moved over and inserted into the opening.

What I claim is:—

1. The combination with a casing, open at its lower side, and a tapping tool extending through the top of the casing, said tool being longitudinally movable, of a holder within the casing and means external to the casing for moving said holder into and out of line with the tool, said holder having a smooth bore or opening therethrough, a fitting for said opening adapted to be driven endwise out of the opening by the longitudinal movement of the tool, said fitting having a socket to receive the tool and having shoulders within the socket for engaging the ends of the wings of the tool but not the central part or point of the tool, and said fitting having also a socket for receiving a plug and shoulders within said latter socket for engaging the end of the plug.

2. The combination with a casing, open at its lower side, and a tapping tool extending through the top of the casing, said tool being longitudinally movable, of a holder within the casing and means external to the casing for moving said holder into and out of line with the tool, said holder having a smooth bore or opening therethrough, a fitting for said opening adapted to be driven endwise out of the opening by the longitudinal reciprocation of the tool, said fitting having a socket to receive the tool and a socket to receive a plug, the first mentioned socket having inclined portions forming shoulders adapted to be engaged by the cutting end of the tool, and the other socket having shoulders for engaging the plug.

3. The combination with a casing, open at its lower side, and a tapping tool extending through the top of the casing, said tool being longitudinally movable and rotatable, of two holders within the casing and means external to the casing for moving said holders into and out of line with the tool, one of said holders having a smooth bore or opening therethrough, a fitting for said opening adapted to be driven endwise out of the opening by the longitudinal reciprocation of the tool, said fitting having a socket to receive the tool and a socket to receive a plug, the first mentioned socket having inclined shoulders adapted to be engaged by the end of the tool, and the other socket having shoulders for engaging the plug, the other of said holders having a threaded opening therethrough and a fitting for said latter holder having an exterior thread for engaging the thread in the opening and having a socket for receiving the tool and an angular socket for receiving a plug.

4. The combination with a casing open at its lower side, of a tool extending through the top of the casing, said tool being longitudinally movable and rotatable, a plurality of longitudinally movable and rotatable rods extending through the top of the casing, said rods having laterally projecting arms within the casing and holders connected to said arms, each holder having a vertical opening therethrough, and means connected with each rod, outside of the casing, for swinging the holder thereon to bring its opening into axial alinement with the tool, said means comprising a lever and an arm attached to the lever and adapted to engage a side of the casing, the latter forming a stop for the arm.

In testimony whereof I affix my signature, in presence of two witnesses.

WILLIAM HEARNS.

Witnesses:
 ROBERT WATSON,
 GEO. C. H. PENN.